United States Patent [19]

Sheih et al.

[11] Patent Number: 4,596,861
[45] Date of Patent: Jun. 24, 1986

[54] ADVANCED EPOXY RESIN FOR CAN COATING APPLICATIONS

[75] Inventors: Pong S. Sheih, Lake Jackson; Manuel C. Tyler, Jr., Angleton, both of Tex.

[73] Assignee: The Dow Chemical Company, Midland, Mich.

[21] Appl. No.: 736,915

[22] Filed: May 22, 1985

[51] Int. Cl.$^4$ .................. C08G 59/02; C08G 59/14; C08L 63/02
[52] U.S. Cl. .................. 525/481; 428/35; 525/510; 528/88; 528/104
[58] Field of Search .................. 528/104, 88; 525/481, 525/510

[56] References Cited

U.S. PATENT DOCUMENTS

| | | | |
|---|---|---|---|
| 3,663,354 | 5/1972 | Ueno et al. | 161/186 |
| 4,105,634 | 8/1978 | Hanson et al. | 528/104 X |
| 4,173,290 | 11/1979 | Kobayashi et al. | 220/75 |
| 4,324,822 | 4/1982 | Kobayashi et al. | 428/35 |
| 4,366,295 | 12/1982 | Tyler et al. | 528/104 X |
| 4,413,015 | 11/1983 | Anderson et al. | 528/104 X |
| 4,525,497 | 6/1985 | Kobayashi et al. | 528/104 X |

FOREIGN PATENT DOCUMENTS 0115432  8/1984  European Pat. Off. .

*Primary Examiner*—Earl Nielsen
*Attorney, Agent, or Firm*—J. G. Carter

[57] ABSTRACT

Advanced epoxy resins are prepared from a liquid diglycidyl ether of bisphenol A and bisphenol A which advanced epoxy resins have an equivalent weight in the range of 3,000 to 3,900 and a weight average molecualr weight of 13,000 to 17,000. When these advanced epoxy resins are formulated into can coating compositions they result in coatings having good wet and dry adhesion.

6 Claims, No Drawings

ADVANCED EPOXY RESIN FOR CAN COATING APPLICATIONS

BACKGROUND OF THE INVENTION

The present invention is directed to advanced epoxy resin compositions which when formulated into a can coating result in a coating which has good wet adhesion as well as good dry adhesion and a method for preparing these resins.

Can coatings have heretofore been formulated from advanced epoxy resins. These coatings usually have good dry adhesion, but relatively poor wet adhesion. It is desirable that such coatings have both good wet and dry adhesion, particularly for food and beverage cans. It has been discovered that when the advanced epoxy resin employed in the coating formulation has an epoxide equivalent weight of from about 3,000 to about 3,900 and a weight average molecular weight of from about 13,000 to about 17,000 the resultant coating has good wet adhesion as well as good dry adhesion.

SUMMARY OF THE INVENTION

The present invention concerns advanced epoxy resins prepared from a diglycidyl ether of bisphenol A having an epoxide equivalent weight of from about 170 to about 195 and bisphenol A wherein the resultant advanced epoxy resin has an epoxide equivalent weight of from about 3,000 to about 3,900 and a weight average molecular weight of from about 13,000 to about 17,000.

Another aspect of the present invention pertains to a process for preparing an epoxy resin having an epoxide equivalent weight of from about 3,000 to about 3,900 and a weight average molecular weight of from about 13,000 to about 17,000 which process comprises (I) heating a mixture comprising (A) a liquid diglycidyl ether of bisphenol A having an average epoxide equivalent weight of from about 170 to about 195 and (B) bisphenol A, (C) a catalytic quantity of one or more catalysts for effecting the reaction between components A and B and (D) a solvent or mixture of solvents such that the exotherm temperature is between about 190° C. and about 210° C.;

(II) cooling the reaction mixture from step I to a temperature between about 185° C. and about 150° C., preferably between about 175° C. and about 165° C. and maintaining the temperature thereat until the desired epoxide equivalent weight and weight average molecular weight are obtained; and thereafter (III) quenching the reaction product from step II to a temperature between about 130° C. and about 90° C. with (E) one or more solvents; and wherein (i) component A is employed in an amount which comprises from about 54 to about 62 percent by weight of the combined weight of components A, B, C and D;

(ii) component B is employed in an amount which comprises from about 30 to about 35 percent by weight of the combined weight of components A, B, C and D;

(iii) component C is employed in an amount which comprises from about 0.01 to about 0.2 percent by weight of the combined weight of components A, B, C and D;

(iv) component D is employed in an amount which comprises from about 5 to about 30 percent by weight of the combined weight of components A, B, C and D;

(v) component E is employed in an amount which comprises from about 30 to about 80 percent by weight of components A, B, C, D and E.

DETAILED DESCRIPTION OF THE INVENTION

Suitable solvents which can be employed in step I of the process of the present invention as component D include, for example, glycol ethers, alcohols, ketones, aromatic hydrocarbons, mixtures thereof and the like.

Particularly suitable such solvents include, for example, 2-butoxyethanol, aromatic solvents having a flash point of 43° C. and a boiling range of 155° C. to 173° C., aromatic solvents having a flash point of 66° C. and a boiling range of 183° C. to 210° C., methyl amyl ketone, diacetone alcohol, methyl ether of dipropylene glycol, 3-methyl-3-methoxy butanol, xylene, mixtures thereof and the like.

Suitable solvents which can be employed in step III of the process of the present invention as component E include, for example, 2-butoxyethanol, aromatic solvents having a flash point of 43° C. and a boiling range of 155° C. to 173° C., aromatic solvents having a flash point of 66° C. and a boiling range of 183° C. to 210° C., methyl amyl ketone, diacetone alcohol, methyl ether of dipropylene glycol, 3-methyl-3-methoxy butanol, xylene, mixtures thereof and the like.

Particularly suitable such solvents include, for example, 2-butoxyethanol, aromatic solvents having a flash point of 43° C. and a boiling range of 155° C. to 173° C., aromatic solvents having a flash point of 66° C. and a boiling range of 183° C. to 210° C., methyl amyl ketone, diacetone alchohol, methyl ether of dipropylene glycol, 3-methyl-3-methoxy butanol, xylene, methyl ethyl ketone, methyl isobutyl ketone, acetone, n-butanol, sec-butanol, isopropanol, butyl acetate, mixtures thereof and the like.

Suitable catalysts which can be employed herein as component C include phosphonium compounds such as, for example, phosphonium carboxylates, phosphonium carboxylate.carboxylic acid complexes, phosphonium halides, phosphonium biscarbonates, phosphonium phosphates, mixtures thereof and the like.

Particularly suitable phosphonium compounds include, for example, ethyltriphenylphosphonium acetate.acetic acid complex, ethyltriphenylphosphonium phosphate, mixtures thereof and the like.

The advanced epoxy resins of the present invention are particularly useful in can coating formulations wherein such formulations contain said advanced epoxy resin, suitable solvents and suitable curing agents and optionally fillers, pigments, flow control agents, surfactants and the like.

Suitable curing agents which can be employed in the formulation of can coatings include, for example, phenol-aldehyde (resole) resins, urea-aldehyde resins, melamine-aldehyde resins, polyamides, acid anhydrides, primary, secondary and tertiary amines, imidazoles, guanadines, mixtures thereof and the like.

The following examples are illustrative of the present invention, but are not to be construed as limiting the scope thereof in any manner.

In the following examples, the epoxide equivalent weight was determined by titration with perchloric acid. The weight average molecular weight was determined by gel permeation chromatography using polystyrene standards. Coatings were tested for wet and dry adhesion using the T-peel test ASTM D1876. The wet adhesion test was performed after the test panels had been immersed in 90° C. water for four days (345,600 s).

EXAMPLE 1

A. Preparation of Advanced Epoxy Resin

To a one liter 5-necked round bottom glass reaction vessel equipped with a means for stirring and temperature control was added 315 g (1.67 equiv.) of a diglycidyl ether of a bisphenol A having an epoxide equivalent weight (EEW) of 188, 13.13 g of xylene, 1.05 g of ethyltriphenylphosphonium phosphate (30% solids in methanol), 172.3 g (1.51 equiv.) of bisphenol A and 39.56 g of the n-butyl ether of ethylene glycol. The contents were heated with stirring to a temperature of 160° C. over a period of 62 minutes (3720 s). The contents were then allowed to exotherm to a temperature of 206° C. after which the contents were cooled to a temperature of 171° C. and maintained at a temperature of about 170° C. for a period of 90 minutes (5400 s). A sample was taken and an analysis revealed it to have an EEW of 3,362 and a weight average molecular weight of 14,457. The resultant product was then quenched to a 40% by weight non volatiles level with 678.3 g of a 60/40 mixture, by weight, of xylene and the n-butyl ether of ethylene glycol, respectively.

B. Preparation of Coating Composition

A coating was prepared by mixing the following components:
- 25 g of the advanced epoxy resin prepared in A above;
- 8.3 g of a proprietary resole curing agent of 30% solids;
- 8.3 g of 60/40 by weight xylene/n-butyl ether of ethylene glycol mixture.

The above mixture was heated for 4 hours (14,400 s) at a temperature of 110° C. After cooling to ambient temperature, the resultant coating composition was coated onto tin-free steel panels and cured in an oven at 210° C. for 0.22 hour (780 s). The thus coated panel was then cut into 5 mm wide strips and between each pair of strips was placed 0.08 mm thick Nylon-12 tape. Each pair of strips was then heat bonded under a pressure of 150 psig (1034.22 kPa) at a temperature of about 205° C. for 0.50 minute (30 s). The panels were then tested for wet and dry adhesion. The results are given in Table I.

COMPARATIVE EXPERIMENT A

A coating composition was prepared and evaluated as in Example 1-B from EPIKOTE 1009 (Shell Chemical Co.), a diglycidyl ether of bisphenol A having an EEW of 2600 and a 16,900 weight average molecular weight. Performance results are given in Table I.

COMPARATIVE EXPERIMENT B

To a 100 gallon (378.5 l) kettle equipped with a means of stirring and temperature control was added 134.6 lbs. (61 kg, 0.72 lb. equiv.) of a diglycidyl ether of bisphenol A having an epoxide equivalent weight (EEW) of 187, 5.6 lbs. (2.54 kg) of xylene, 0.45 lbs. (0.2 kg) of ethyltriphenylphosphonium phosphate (30% solids in methanol), 73.7 lbs. (33.43 kg, 0.65 lb. equiv.) of bisphenol A and 17.5 lbs. (7.94 kg) of the n-butyl ether of ethylene glycol. The contents were heated with stirring to a temperature of 160° C. over 75 minutes (4500 s). The contents were then allowed to exotherm to a temperature of 180° C. and cooled to a temperature of 170° C. and reacted for 134 minutes (8040 s) post maximum exotherm. A sample was taken and analysis revealed it to have an EEW of 3760 and a 17,600 weight average molecular weight. The resultant product was then quenched to a 40% by weight non-volatiles level with 114.8 lbs. (52.1 kg) of the n-butyl ether of ethylene glycol and 171.7 lbs. (77.88 kg) of xylene.

COMPARATIVE EXPERIMENT C

To a 300 gallon (1135.6 l) kettle equipped with a means of stirring and temperature control was added 595 lbs. (269.89 kg, 3.16 lb. equiv.) of a diglycidyl ether of bisphenol A having an epoxide equivalent weight (EEW) of 186, 25 lbs. (11.34 kg) of xylene, 2 lbs. (0.91 kg) of ethyltriphenylphosphonium phosphate (30% solids in methanol), 327 lbs. (148.33 kg, 2.87 lb. equiv.) of bisphenol A and 78 lbs. (35.38 kg) of the n-butyl ether of ethylene glycol. The contents were heated with stirring to a temperature of 154° C. over 63 minutes (3780 s). The contents were then allowed to exotherm to a temperature of 197° C. and cooled to a temperature of 171° C. and reacted for 65 minutes (3900 s) past maximum exotherm. A sample was taken and analysis revealed it to have an EEW of 2756 and a 10,700 weight average molecular weight. The resultant product was then quenched to a 40% by weight non-volatiles level with 200 lbs. (90.72 kg) of the n-butyl ether of ethylene glycol, 278 lbs. (126.1 kg) of cyclohexanone, 278 lbs. (126.1 kg) of n-butanol, 253 lbs. (114.76 kg) of xylene, and 278 lbs. (126.1 kg) of an aromatic solvent having a flash point of 43° C. and a boiling range of 155° C. to 173° C.

COMPARATIVE EXPERIMENT D

To a 300 gallon (1135.6 l) kettle equipped with a means of stirring and temperature control was added 595 lbs. (269.89 kg, 3.2 lb. equiv.) of a diglycidyl ether of bisphenol A having an epoxide equivalent weight (EEW) of 186, 25 lbs. (11.34 kg) of xylene, 2 lbs. (0.91 kg) of ethyltriphenylphosphonium phosphate (30% solids in methanol), 327 lbs. (148.33 kg, 2.87 lb. equiv.) of bisphenol A and 78 lbs. (35.38 kg) of the n-butyl ether of ethylene glycol. The contents were heated with stirring to a temperature of 170° C. over 74 minutes (4440 s). The contents were then allowed to exotherm to a temperature of 216° C. and cooled to a temperature of 170° C. and reacted for 80 minutes (4800 s) post maximum exotherm. A sample was taken and analysis revealed it to have an EEW of 3675 and a 17,400 weight average molecular weight. The resultant product was then quenched to a 40% by weight non-volatiles level with 200 lbs. (90.72 kg) of the n-butyl ether of ethylene glycol, EB, 278 lbs. (126.1 kg) of cyclohexanone, 278 lbs. (126.1 kg) of n-butanol, 253 lbs. (114.76 kg) of xylene, and 278 lbs. (126.1 kg) of an aromatic solvent having a flash point of 43° C. and a boiling range of 155° C. to 173° C.

EXAMPLE 2

To a 300 gallon (1135.6 l) kettle equipped with a means of stirring and temperature control was added 596 lbs. (269.89 kg, 3.2 lb. equiv.) of a diglycidyl ether of bisphenol A having an epoxide equivalent weight (EEW) of 186, 25 lbs. (11.34 kg) of xylene, 2 lbs. (0.91 kg) of ethyltriphenylphosphonium phosphate (30% solids in methanol), 327 lbs. (148.33 kg, 2.87 lb. equiv.)

of bisphenol A and 78 lbs. (35.38 kg) of the n-butyl ether of ethylene glycol. The contents were heated with stirring to a temperature of 160° C. over 74 minutes (4440 s). The contents were then allowed to exotherm to a temperature of 206° C. and cooled to a temperature of 175° C. and reacted for 69 minutes (4140 s) post maximum exotherm. A sample was taken and analysis revealed it to have an EEW of 3583 and a 15,700 weight average molecular weight. The resultant product was then quenched to a 40% by weight non-volatiles level with 200 lbs. (90.72 kg) of the n-butyl ether of ethylene glycol, 278 lbs. (126.1 kg) of cyclohexanone, 278 lbs. (126.1 kg) of n-butanol, 253 lbs. (114.76 kg) of xylene, and 278 lbs. (126.1 kg) of an aromatic solvent having a flash point of 43° C. and a boiling range of 155° C. to 173° C.

EXAMPLE 3

To a 300 gallon (1135.6 l) kettle equipped with a means of stirring and temperature control was added 596 lbs. (270.34 kg, 3.2 lb. equiv.) of a diglycidyl ether of bisphenol A having an epoxide equivalent weight (EEW) of 186, 25 lbs. (11.34 kg) of xylene, 2 lbs. (0.91 kg) of ethyltriphenylphosphonium phosphate (30% solids in methanol), 327 lbs. (148.33 kg, 2.87 lb. equiv.) of bisphenol A and 78 lbs. (35.38 kg) of the n-butyl ether of ethylene glycol. The contents were heated with stirring to a temperature of 153° C. over 76 minutes (4560 s). The contents were then allowed to exotherm to a temperature of 200° C. and cooled to a temperature of 170° C. and reacted for 94 minutes (5640 s) post maximum exotherm. A sample was taken and analysis revealed it to have an EEW of 3116 and a 13,200 weight average molecular weight. The resultant product was then quenched to a 40% by weight non-volatiles level with 200 lbs. (90.72 kg) of the n-butyl ether of ethylene glycol, 278 lbs. (126.1 kg) of cyclohexanone, 278 lbs. (126.1 kg) of n-butanol, 253 lbs. (114.76 kg) of xylene, and 278 lbs. (126.1 kg) of an aromatic solvent having a flash point of 43° C. and a boiling range of 155° C. to 173° C.

EXAMPLE 4

To a 100 gallon (378.54 l) kettle equipped with a means of stirring and temperature control was added 132.6 lbs. (60.15 kg, 0.71 lb. equiv.) of a diglycidyl ether of bisphenol A having an epoxide equivalent weight (EEW) of 187, 5.5 lbs. (2.5 kg) of xylene, 0.45 lb. (0.2 kg) of ethyltriphenylphosphonium phosphate (30% solids in methanol), 73 lbs. (33.11 kg, 0.64 lb. equiv.) of bisphenol A and 17.3 lbs. (7.85 kg) of the n-butyl ether of ethylene glycol. The contents were heated with stirring to a temperature of 180° C. over 68 minutes (4080 s). The contents were then allowed to exotherm to a temperature of 202° C. and cooled to a temperature of 172° C. and reacted for 127 minutes (7620 s) post maximum exotherm. A sample was taken and analysis revealed it to have an EEW of 3870 and a 15,200 weight average molecular weight. The resultant product was then quenched to a 40% by weight non-volatiles level with 113.1 lbs. (51.3 kg) of the n-butyl ether of ethylene glycol and 169.2 lbs. (76.75 kg) of xylene.

EXAMPLE 5

To a 2000 gallon (7570.8 l) kettle equipped with a means of stirring and temperature control was added 3159 lbs. (1432.92 kg, 16.71 lb. equiv.) of a diglycidyl ether of bisphenol A having an epoxide equivalent weight (EEW) of 189, 133 lbs. (60.33 kg) of xylene, 10.5 lbs. (4.76 kg) of ethyltriphenylphosphonium phosphate (30% solids in methanol), 1720.5 lbs. (6.85 kg, 15.09 lb. equiv.) of bisphenol A and 411 lbs. (186.43 kg) of the n-butyl ether of ethylene glycol. The contents were heated with stirring to a temperature of 150° C. over 60 minutes (3600 s). The contents were then allowed to exotherm to a temperature of 198° C. and cooled to a temperature of 178° C. and reacted for 60 minutes (3600 s) post maximum exotherm. A sample was taken and analysis revealed it to have an EEW of 3210 and a 14,200 weight average molecular weight. The resultant product was then quenched to a 40% by weight non-volatiles level with 1056 lbs. (479 kg) of the n-butyl ether of ethylene glycol, 1467 lbs. (665.43 kg) of cyclohexanone, 1467 lbs. (665.43 kg) of n-butanol, 1334 lbs. (605.1 kg) of xylene, and 1467 lbs. (665.43 kg) of an aromatic solvent having a flash point of 43° C. and a boiling range of 155° C. to 173° C.

TABLE I

| EXAMPLE OR COMPARATIVE EXPERIMENT | EEW | $\overline{M}_w$ | ADHESION DRY lbs/5 mm | DRY kg/5 mm | WET lbs/5 mm | WET kg/5 mm |
|---|---|---|---|---|---|---|
| Example 1 | 3362 | 14,457 | 10.0 | 4.5 | 13.0 | 5.9 |
| Comparative Experiment A | 2600 | 16,900 | 12.8 | 5.8 | 6.3 | 2.9 |
| Comparative Experiment B | 3760 | 17,600 | 13.0 | 5.9 | 7.5 | 3.4 |
| Comparative Experiment C | 2756 | 10,700 | 2.0 | 0.9 | 13.3 | 6.0 |
| Comparative Experiment D | 3675 | 17,400 | 13.0 | 5.9 | 7.0 | 3.2 |
| Example 2 | 3583 | 15,700 | 13.0 | 5.9 | 9.0 | 4.1 |
| Example 3 | 3116 | 13,200 | 11.8 | 5.4 | 11.5 | 5.2 |
| Example 4 | 3870 | 15,200 | 10.0 | 4.5 | 11.0 | 5.0 |
| Example 5 | 3210 | 14,200 | 10.5 | 4.8 | 13.5 | 6.1 |

COMPARATIVE EXPERIMENT E

Example 2 of EPO Application Publication No. 0,115,432 was essentially duplicated. In this experiment a commercially available liquid epoxy resin which was a diglycidyl ether of bisphenol A having an epoxide equivalent weight of 187 (available from The Dow Chemical Company as D.E.R. ® 331) was employed as the starting resin. The results are given in Table II.

COMPARATIVE EXPERIMENT F

Example 8 of EPO Application Publication No. 0,115,432 was essentially duplicated. In this experiment a commercially available liquid epoxy resin which was a diglycidyl ether of bisphenol A having an epoxide equivalent weight of 187 (available from The Dow Chemical Company as D.E.R. ® 331) was employed as the starting resin. The results are given in Table II.

TABLE II

| PROPERTY | COMPARATIVE EXPERIMENT LETTER E | F |
|---|---|---|
| Epoxide Equivalent Weight | 3,210 | 3,490 |
| Number Average Molecular Weight | 3,915 | 4,053 |
| Weight Average Molecular Weight | 11,862 | 12,083 |
| Dry Adhesion, lbs/5 mm | 1.3 | 1.4 |
| kg/5 mm | 0.6 | 0.6 |
| Wet Adhesion, lbs/5 mm | 8.5 | 13.2 |
| kg/5 mm | 3.9 | 6.0 |

We claim:

1. An advanced epoxy resin prepared from a diglycidyl ether of bisphenol A having an epoxide equivalent weight of from about 170 to about 195 and bisphenol A wherein the resultant advanced epoxy resin has an epoxide equivalent weight of from about 3,000 to about 3,900 and a weight average molecular weight of from about 13,000 to about 17,000.

2. A process for preparing an epoxy resin having an epoxide equivalent weight of from about 3,000 to about 3,900 and a weight average molecular weight of from about 13,000 to about 17,000 which process comprises
   (I) heating a mixture comprising (A) a liquid diglycidyl ether of bisphenol A having an average epoxide equivalent weight of from about 170 to about 195, (B) bisphenol A, (C) a catalytic quantity of one or more catalysts for effecting the reaction between components A and B and (D) a solvent or mixture of solvents such that the exotherm temperature is between about 190° C. and about 210° C.;
   (II) cooling the reaction mixture from step I to a temperature between about 185° C. and about 150° C. and maintaining the temperature thereat until the desired epoxide equivalent weight and weight average molecular weight are obtained; and thereafter
   (III) quenching the reaction product from step II to a temperature between about 130° C. and about 90° C. with (E) one or more solvents; and wherein
   (i) component A is employed in an amount which comprises from about 54 to about 62 percent by weight of the combined weight of components A, B, C and D;
   (ii) component B is employed in an amount which comprises from about 30 to about 35 percent by weight of the combined weight of components A, B, C and D;
   (iii) component C is employed in an amount which comprises from about 0.01 to about 0.2 percent by weight of the combined weight of components A, B, C and D;
   (iv) component D is employed in an amount which comprises from about 5 to about 30 percent by weight of the combined weight of components A, B, C and D;
   (v) component E is employed in an amount which comprises from about 30 to about 80 percent by weight of components A, B, C, D and E.

3. A method of claim 2 wherein said catalyst is one or more phosphonium compounds and in step II, the reaction mixture from step I is cooled to a temperature between about 175° C. and about 165° C.

4. A method of claim 3 wherein
   (i) component C is ethyltriphenylphosphonium phosphate, ethyltriphenylphosphonium acetate.acetic acid complex or a mixture thereof;
   (ii) component D is 2-butoxyethanol, xylene, aromatic petroleum solvent, 3-methyl-3-methoxy butanol, methyl ether of dipropylene glycol, or a mixture thereof;
   (iii) component E is 2-butoxyethanol, xylene, aromatic petroleum solvent, cyclohexanone, n-butanol, or a mixture thereof.

5. A can coating composition having good wet adhesion as well as good dry adhesion which comprises an advanced epoxy resin of claim 1, a curing quantity of a suitable curing agent or mixture of curing agents and one or more solvents in a quantity to provide the coating composition with a suitable application viscosity.

6. A can coating composition of claim 5 wherein said curing agent is phenol-formaldehyde, urea formaldehyde, or a mixture thereof.

* * * * *